United States Patent Office 3,637,620
Patented Jan. 25, 1972

3,637,620
PROCESS FOR THE POLYMERIZATION OF VINYL CHLORIDE
Luigi Patron and Alberto Moretti, Venice, and Renato Pasqualetto, Porto Marghera, Italy, assignors to Chatillon-Società Anonima Italiana per le Fibre Tessili Artificiali S.p.A., Milan, Italy
No Drawing. Continuation-in-part of application Ser. No. 836,166, June 24, 1969. This application Feb. 26, 1970, Ser. No. 14,670
Claims priority, application Italy, Feb. 28, 1969, 13,477/69
Int. Cl. C08f 3/30, 1/04, 1/62
U.S. Cl. 260—85.5
20 Claims

ABSTRACT OF THE DISCLOSURE

Bulk polymerization of vinyl chloride in the presence of a catalytic system consisting essentially of an organic hydroperoxide activated by an alcoholic solution of sulphur dioxide and at least one oxide or hydroxide of an alkali metal or of magnesium or magnesium sulphite, wherein the polymerization process is conducted continuously or semi-continuously at a temperature higher than 0° C.

---

This application is a continuation-in-part of application, Ser. No. 836,166, filed June 24, 1969.

The present invention relates to a process for the bulk polymerization of vinyl chloride at a temperature higher than 0° C. and represents an improvement in the process disclosed in copending U.S. patent application, Ser. No. 836,166, filed on June 24, 1969.

In said prior patent application the applicants described a process for the bulk polymerization of vinyl chloride at low temperature by using a catalytic system consisting essentially of an organic hydroperoxide activated by an alcoholic solution of sulphur dioxide and of at least one oxide or hydroxide of an alkali metal or of magnesium or magnesium sulphite, in which the $SO_2/Me$ ratio is lower than 1.5, where $SO_2$ is the concentration in gram-moles/liter of the total sulphur dioxide, and Me is the concentration of the metal in gram-equivalent/liter.

As described in said prior patent application, the bulk polymerization can be carried out continuously, semi-continuously or batchwise.

Such a catalytic system is characterized by a high decomposition rate even at temperatures much lower than 0° C., such as at between —20° C. and —60° C. At such low temperatures in fact, even by using hydroperoxide concentrations lower than 0.1% in respect to the monomer, high polymerization rates are obtained. This particular kinetic behaviour of the aforementioned catalytic system therefore could not permit foreseeing its applicability to the polymerization of vinyl chloride at high temperature, for instance higher than 10° C. It is known in fact that, if the decomposition rate of a catalytic system is too high, inhibition of the polymerization occurs due to the re-combination of the polymeric radicals with the primary radicals.

It has now surprisingly been found that the bulk polymerization of vinyl chloride at a temperature higher than 0° C. can be effectively initiated by using the catalytic system consisting essentially of an organic hydroperoxide activated by an alcoholic solution of sulphur dioxide and of at least one oxide or hydroxide of an alkali metal or of magnesium or magnesium sulphite, provided that the polymerization is carried out according to a continuous or semi-continuous process with gradual addition of the components of the catalytic system to the monomer.

It is in fact expressly pointed out that, if the polymerization is carried out by instantaneously adding to the monomer contained in a polymerization autoclave the entire amount of the components of the catalytic system contemplated by the formulation (in a process that can be called discontinuous) no appreciable polymerization is obtained.

In the following Table I the polymerization conversions and the intrinsic viscosity of the polymer obtained by bulk polymerization carried out by the continuous, semi-continuous and discontinuous process, using the aforementioned catalytic system, are reported:

TABLE I

| Polymerization process | Catalyst feeding time (hours) | Dwell time [1] (hours) | Conversion (percent) | Intrinsic viscosity $[\eta]$, dl./g. |
|---|---|---|---|---|
| Discontinuous | 0 | 10 | 2.0 | 0.033 |
| Semi-continuous | 10 | 10 | 32 | 1.15 |
| Continuous | | 10 | 34 | 1.25 |

[1] Reaction or permanence time of the reacting agents in contact with each other.

The polymerization was carried out in bulk and at 40° C. in the presence of 0.15%, with respect to the monomer, of cumene hydroperoxide and 0.125% of sulphur dioxide and 0.039% of magnesium oxide the last two dissolved in a 12% and 3.75%, respectively, methanol solution.

The catalytic system used in the process of the present invention offers the advantage, in comparision to the catalysts commonly used in the bulk polymerization of vinyl chloride, of being industrially effective even if used in small amounts, due to its high effectiveness and its high decomposition rate. The possibility of carrying out the polymerization with low quantities of catalytic formulations, not only represents a considerable economical advantage but makes it possible to obtain polymers having desirable characteristics of color and of thermal stability.

As stated in copending patent application, Ser. No. 836,166 by organic hydroperoxides are meant all the organic compounds having the general formula

in which R may be a linear or branched alkyl radical, a cycloalkyl radical, an aryl radical or an aryl-alkyl radical. Examples of organic compounds having the general formula R—O—O—H that may be advantageously used in the process according to this invention are: methyl-ethyl-, n.propyl-, tert.butyl-, n.butyl-, amyl-, hexyl-, octyl-, etc. hydroperoxide, ethyl-benzyl-hydroperoxide, iso-butyl-benzyl-hydroperoxide, phenyl-isopropyl-hydroperoxide, etc. Particularly advantageous results are achieved by using cumene-hydroperoxide or tert.-butyl-hydroperoxide.

The concentration of organic hydroperoxide is not critical and typically may vary between 0.01% and 3% by weight with respect to the monomers. Hydroperoxide concentrations between 0.02% and 1% are, however, preferred.

The organic hydroperoxide can be fed to the reaction mass either as such or in solution in a suitable solvent such as methyl-, ethyl-, or propyl-alcohol, etc.

The sulphur dioxide is used in an amount between 0.01% and 3% by weight with respect to the monomer. Sulphur dioxide concentrations between 0.03 and 1% are preferred.

As specified in the aforementioned earlier patent application, any oxide or hydroxide of an alkali metal or of magnesium or magnesium sulphite may be used in the process of the present invention.

It has been found, however, that the metal exerts a certain influence on the color and on the heat-stability of the color of the polymer obtained. In fact, from this point of view best results will be obtained by using magnesium oxide or hydroxide or magnesium sulphite.

The concentration of the oxides or hydroxides of an alkali metal or of magnesium, or that of the magnesium sulphite in the reaction mixture, is between 0.01 and 5% by weight with respect to the monomers, but preferably between 0.02 and 1%.

As stated previously, the oxide or the hydroxide or the above-mentioned salt is fed to the reaction medium in alcoholic solution containing the predetermined quantity of sulphur dioxide. An aliphatic alcohol having from 1 to 5 carbon atoms is used as the alcohol. Amongst these, methyl alcohol and ethyl alcohol are preferred.

The nature and quantity of such alcohols have no influence on the course of the polymerization, provided that the alcohol be present in a quantity sufficient to dissolve the $SO_2$ and the oxides or the hydroxides or the metal salt in the indicated proportions. In practice, for economical reasons, it is preferred to use concentrated solutions.

The temperature at which the polymerization is carried out may vary from about 0° C. to 100° C. and is preferably between 20° C. and 60° C.

By bulk polymerization it is meant not only the polymerization carried out by incorporating the catalytic system in the undiluted monomer, but also in the presence of non-reacting organic compounds which are liquid at the polymerization temperature and have a fluidizing action on the polymerization mass in order to render this latter more easily stirrable. The presence of such organic compounds has no influence on the polymerization reaction and their concentration if desired can be equal to that of the monomer. As organic fluidizing agents the following substances may be used: aliphatic hydrocarbons, aryl-hydrocarbons, cycloalkyl hydrocarbons and halogenated saturated hydrocarbons, the latter being preferred.

If desired, small quantities of alkyl mercaptans may be introduced into the reaction zone for regulating the molecular weight of the polymer. Furthermore, it has been observed that the alkyl mercaptans, besides acting as chain regulators, also act as fluidizers of the polymerization mixture. Amongst the suitable alkyl mercaptans, those having from 1 to 15 carbon atoms are preferred, and amongst these, those having up to 4 carbon atoms yield the best results.

It is advisable to conduct the polymerization in the absence of oxygen which exerts an inhibiting effect on the polymerization. In general, for the purpose of removing the oxygen from the polymerization reactor there are used suitable inert gases such as for instance nitrogen.

As stated above, an essential condition in order that the polymerization take place is that the polymerization process be carried out continuously or semi-continuously.

By continuous polymerization is meant the process in which the components of the catalytic system and the monomer are continuously and separately fed to the reactor; the monomer flow-rate with respect to the reactor's volume represents the average time of permanence of the reactants in contact with each other (dwell time). In this process the reaction mixture is continuously removed from the reactor by means of an overflow.

By semi-continuous polymerization it is meant that the process in which the components of the catalytic system are fed over a prolonged period of time to a closed reactor containing the monomer. In this case the polymer is recovered at the end of the reaction.

The polymerization may be inhibited at any desired stage and at the desired molecular weight by treating the reaction mass with an aqueous or alcoholic solution of a hydroxylamine salt, preferably hydroxylamine hydrochloride or sulphate.

The polyvinylchloride obtained by the process of the present invention is very white, has excellent thermal stability, a homogeneous molecular weight and a high apparent density. This last property is particularly desirable in the application of this polymer in the production of fibers and plastic materials.

It is to be understood that the catalytic systems used in the process of this invention may also in like manner be applied with advantage to the preparation of vinyl chloride copolymers containing up to 50% by weight of at least one other ethylenically unsaturated monomer copolymerizable with vinyl chloride. The only difference, with respect to the above described process, is that the starting monomers are a mixture of vinyl chloride and one or more other ethylenically unsaturated monomers copolymerizable with vinyl chloride. It is to be understood that the term "ethylenically unsaturated monomers" has reference to organic compounds containing the C=C group. Examples of such compounds are: vinyl or vinylidene compounds such as vinylidene fluoride or chloride, vinyl fluoride, vinyl esters of carboxylic aliphatic acids containing from 2 to 18 carbon atoms, such as, for instance, the vinyl esters of acetic acid, of propionic acid, etc., monomers of the acrylic type such as acrylic acid, methacrylic acid and their derivatives such as acrylonitrile, acrylates or methacrylates of aliphatic alcohols containing from 1 to 12 carbon atoms, such as for instance methyl and ethyl acrylate and methacrylate, etc.

In order still more clearly to illustrate the present invention, the following specific examples are given:

EXAMPLES (1–4)

Into a 3-liter autoclave, provided with an outer heating jacket, an agitator and a thermostatic control and previously charged with 2,000 g. of vinyl chloride and 500 g. of ethyl chloride, the following substances were fed for 10 hours:

an organic hydroperoxide of the type and with the feeding rate reported in the following Table II,
an alcoholic solution of $SO_2$ containing an oxide or hydroxide of alkali metal or of magnesium or magnesium sulphite with the feeding rate reported in Table II.

At the end of feeding, the suspension of polymer thus obtained was discharged into an aqueous solution of hydroxylamine hydrochloride kept at 50° C. and at pH 6 by addition of sodium bicarbonate in order to stop the polymerization. The polymer was separated by centrifugation and then washed with water and dried at 70° C. in an oven provided with forced ventilation.

The polymerization conversion, intrinsic viscosity [η] and the apparent density of the polymer obtained are reported in Table II. The intrinsic viscosity [η] is determined in cyclohexanone at 30° C. and is expressed in dl/g.

The apparent density is expressed in g./cm.$^3$.

TABLE II

| Organic hydroperoxide | | Solution consisting of— | | | | | | | |
|---|---|---|---|---|---|---|---|---|---|
| | | | | | Oxide or hydroxide or MgSO$_3$ | | | | |
| Type | G./h. | Alcohol | Cc./h. | SO$_2$ (g./h) | Type | Percent | Temp. (° C.) | Conversion (percent) | Intrinsic viscosity, dl./g. | Apparent density, g./cc. |
| Cumene hydroperoxide | 0.2 | Methyl alcohol | 1.5 | 0.15 | MgO | 0.047 | 25 | 19.5 | 1.08 | 0.39 |
| Do | 0.2 | do | 1.5 | 0.15 | Mg(OH)$_2$ | 0.068 | 30 | 26 | 1.22 | 0.41 |
| Do | 0.2 | do | 1.5 | 0.075 | MgSO$_3$ | 0.122 | 40 | 38 | 1.30 | 0.43 |
| Tert.butylhydroperoxide | 0.1 | Ethyl alcohol | 4.5 | 0.15 | NaOH | 0.094 | 50 | 42 | 1.40 | 0.44 |

We claim:
1. In a process for the bulk polymerization of vinyl chloride comprising conducting the polymerization in the presence of a catalytic system consisting essentially of an organic hydroperoxide activated by an alcoholic solution of sulphur dioxide and at least one oxide or hydroxide of an alkali metal or of magnesium or mangesium sulphite, the improvement wherein the polymerization is conducted continuously or sem-continuously and at a temperature between 0° C. and 100° C. and with the gradual addition of the components of the catalytic system to the monomer.

2. A process according to claim 1 where the alcoholic solution contains sulphur dioxide and magnesium oxide.

3. A process according to claim 1, wherein the alcoholic solution contains sulphur dioxide and magnesium hydroxide.

4. A process according to claim 1, wherein the alcoholic solution contains sulphur dioxide and magnesium sulphite.

5. A process according to claim 1, wherein the preparation of the alcoholic solution, an aliphatic alcohol having 1 to 5 carbon atoms is used.

6. A process according to claim 1, wherein the amount of oxide or hydroxide of an alkali metal or of magnesium or magnesium sulphite, is between 0.01 and 5% by weight with respect to the monomers.

7. A process according to claim 6, wherein the amount of oxide or hydroxide of an alkali metal or of magnesium or magnesium sulphite is between 0.02 and 1% by weight.

8. A process according to claim 1 wherein the hydroperoxide concentration varies between 0.01 and 3% with respect to the monomers fed.

9. A process according to claim 8, wherein the organic hydroperoxide concentration varies between 0.02 and 1% with respect to the monomers fed.

10. A process according to claim 1, wherein as the organic hydroperoxide, cumene hydroperoxide or tert. butyl hydroperoxide is used.

11. A process according to claim 1, wherein the sulphur dioxide concentration is between 0.01% and 3% by weight with respect to the monomer.

12. A process according to claim 11, wherein the sulphur dioxide concentration is between 0.03% and 1% by weight.

13. A process according to claim 1, wherein the polymerization is carried out in the presence of a fluidizing agent.

14. A process according to claim 13, wherein the fluidizing agent is a halogenated hydrocarbon.

15. A process according to claim 1, wherein 50 to 1,000 p.p.m. of an alkyl mercaptan having 1 to 15 carbon atoms are fed to the polymerization mass.

16. A process according to claim 15, wherein the alkyl mercaptan has at most 4 carbon atoms.

17. A process according to claim 1, wherein the polymerization is inhibited at the desired level by treating the polymerization mass with an aqueous or alcoholic solution of a hydroxylamine salt.

18. A process according to claim 17, wherein the hydroxylamine salt is the hydrochloride or sulphate.

19. A process according to claim 1, wherein vinyl chloride is copolymerized with up to 50% of at least one other copolymerizable ethylenically unsaturated monomer.

20. A process according to claim 1, wherein the temperature is between 20° C. and 60° C.

References Cited

UNITED STATES PATENTS 3,255,164  3/1966  Visger et al. _____ 260—87.5

JOSEPH L. SCHOFER, Primary Examiner

J. A. DONAHUE, JR., Assistant Examiner

U.S. Cl. X.R.

360—86.3, 87.1, 87.5 A, 87.7, 92.8

UNITED STATES PATENT OFFICE
CERTIFICATE OF CORRECTION

Patent No. 3,637,620            Dated January 25, 1972

Inventor(s) LUIGI PATRON et al.

It is certified that error appears in the above-identified patent and that said Letters Patent are hereby corrected as shown below:

The priority claim in the heading should read:

--Claims priority, applications Italy,

June 28, 1968, No. 18,362 A/68

February 28, 1969, No. 13,477 A/69--

Signed and sealed this 10th day of July 1973.

(SEAL)
Attest:

EDWARD M. FLETCHER, JR.　　　　　RENE TEGTMEYER
Attesting Officer　　　　　　　　Acting Commissioner of Patents